United States Patent Office 2,710,245
Patented June 7, 1955

2,710,245

PROCESS FOR THE PRODUCTION OF HYDROCYANIC ACID

Otto Bretschneider, Frankfurt (Main), Germany, assignor to Deutsche Gold- und Silber-Scheideanstalt vormals Roessler, Frankfurt (Main), Germany, a corporation of Germany No Drawing. Application October 27, 1950,
Serial No. 192,642

Claims priority, application Germany October 31, 1949

7 Claims. (Cl. 23—151)

The present invention relates to an improved process for the continuous production of hydrocyanic acid.

It is already known that cyanides can be produced from carbon, nitrogen and an alkali, such as $Na_2CO_3$, in the presence of an iron catalyst at high temperatures in accordance with the following equation:

$$Na_2CO_3 + 4C + N_2 = 2NaCN + 3CO - 146 \text{ Cal.}$$

The formation of the cyanide begins noticeably at temperatures above 800° C. However, the alkali and the formed cyanide are molten at these temperatures so that the reaction mass becomes very sticky. The tackiness of such mass prevents the possibility of carrying out the reaction continuously upon a technical scale as none of the normal furnaces, such as, for example, rotary tubular furnaces, are suitable for the continuous treatment of tacky materials at temperatures above 800° C. It was found that the use of a large excess of the powdered iron which serves as a catalyst will tend to overcome the tackiness of the reaction mass. However, the amount of iron powder required therefor is disproportionately high, which causes an undesired burden upon a continuous process.

Further experiments employing a large excess of carbon, for example, charcoal, have shown that while the tackiness of the reaction mass could be prevented thereby, the yield of hydrocyanic acid obtained upon working up the reaction mass was substantially lower than when the process is carried out in the absence of such excess. The decrease in the yield of hydrocyanic acid can amount to 25% and more. Evidently, the excess of the carbon is converted during the reaction into a form in which it exerts a catalytic decomposing action upon hydrocyanic acid.

It has now been found that excellent results can be obtained in a continuous process, if substantial quantities of a solid material which is stable under the reaction conditions and inert with respect to hydrocyanic acid are mixed with the starting materials. Contrary to expectations, graphite has been discovered to be especially well suited as it was found that it can be mixed with the reaction components in any desired quantity or grain size without producing an active form of carbon in the reaction product which would cause any substantial loss of hydrocyanic acid.

Preferably the reaction components are only mixed with a sufficient quantity of graphite powder to prevent tackiness of the reaction mixture at temperatures above 800° C. The graphite serves only as a diluent, while the carbon necessary for the reaction is supplied in the form of wood charcoal or other reactive forms of carbon. For example, excellent results were obtained when employing a mixture of the following proportions.

0.7 kg. $Na_2CO_3$
0.7 kg. iron powder
0.35 kg. charcoal
1.75 kg. graphite powder This mixture was continuously introduced into a rotary tube furnace and heated therein to 950° C. under a current of nitrogen without encountering any difficulties and the resulting cyanide containing product was continuously withdrawn. Tackiness did not occur in the reaction mixture and upon recovery of hydrocyanic acid from the reaction product a yield of 98% of the theoretical was obtained. Every type of furnace suitable for continuous operation under the reaction conditions of the process is suitable for the process in accordance with the invention.

It was, furthermore, found that the reaction mixture, in accordance with the invention, can itself be employed for resistance heating even in a rotary furnace. This was in no way to be expected as the mixture to a large part consists of poorly conductive finely divided carbon, such as, charcoal. It was, however, unexpectedly discovered that the process, in accordance with the invention, could be carried out continuously in a rotary furnace without difficulty while the reaction mixture was employed as a resistance element. Preferably, the reaction components are preheated by passing the reaction gases thereover counter-currently whereby it is possible to dispense with the use of any external heating. The electric heating current can, for example, be supplied to the reaction components which are to be heated to reaction temperatures in a rotary tube by causing the reaction mixture which is to be heated to flow continuously over the electrodes which serve to supply the current whereby uniform distribution of the current through the reaction mixture is obtained.

Especially good thermal efficiency is obtained with the direct resistance heating of the reaction mixture. Furthermore, a very uniform temperature distribution is obtained in the reaction mixture which very favorably affects the time required for the reaction as well as the capacity of the furnace employed. The direct heating, contrary to indirect heating, is not dependent upon the available heat transfer surfaces in the furnace. This as in all endothermic processes, is of special significance in the process in accordance with the invention.

The recovery of the hydrocyanic acid from the reaction product is effected in accordance with the invention in a second step wherein such product is treated with steam and carbon dioxide according to the following equation.

$$2NaCN + H_2O + CO_2 = Na_2CO_3 + 2HCN$$

It was found that the best results are obtained if the treatment is carried out at temperatures below 200° C., preferably between 150° C. and 175° C. A special advantage of this process for the recovery of hydrocyanic acid in gaseous form is, that it is obtained in high concentration, for example, 30%, and over and can, if desired, be employed directly for organic syntheses. As the cooled resultant gas mixture contains $CO_2$, in addition to the hydrocyanic acid, the isolation of the hydrocyanic acid may be effected in a very simple manner.

It was not to be expected that hydrocyanic acid could be recovered in this manner in a substantially theoretical yield. It was rather to be expected that the presence of the iron catalyst in the reaction product would promote the polymerization of the hydrocyanic acid produced. Also it could be expected that the hydrocyanic acid would be partially saponified and converted to ammonia by the action of the carbon dioxide and steam. However, contrary to expectations, no noteworthy formation of ammonia or of polymerization products of hydrocyanic acid could be observed even though the reaction is carried out at elevated temperatures.

The continuous process in accordance with the invention, is especially well suited for carrying out a cyclic process. For example, the exhaust gas formed during the cyaniding step which contains CO and nitrogen can be burned with the addition of air to form carbon dioxide. This reaction can be promoted with catalysts such as copper or copper oxide. The heat of reaction can be used in the cyaniding process. The carbon dioxide contained in the combustion gases can be separated from the nitrogen in a known manner by scrubbing the gases with a potassium carbonate solution under pressure and recovering the carbon dioxide from the resulting solution by reducing the pressure. The resulting carbon dioxide, after mixing with steam, can be employed for recovery of the hydrocyanic acid from the cyanide reaction product. In a similar manner the nitrogen content of the combustion gas can be employed in the cyaniding reaction step. As the presence of free oxygen therein is detrimental, it is advisable that the amount of air supplied for the conversion of the CO to $CO_2$ in the exhaust gas of the cyaniding step is either just sufficient or insufficient for the complete combustion of the CO so that no oxygen or a slight quantity of CO still remains in the combustion gas.

The sodium carbonate formed as a by-product in the production of the hydrocyanic acid together with the graphite and iron catalyst contained therein are reemployed in the cyaniding step after addition of the required amount of carbon, for example wood charcoal.

Therefore, in the cyclic process the alkali carbonate, the catalyst and the graphite powder are continuously recycled and the exhaust gases are also reused to a great extent. Consequently, the process in accordance with the invention provides a method of producing hydrocyanic acid substantially from water, air and carbon.

The addition of the inert solid diluent in accordance with the invention, such as, for example, graphite, not only renders it possible to carry out the process continuously upon a feasible scale, but it also renders it unnecessary to grind the solidified reaction product obtained in accordance with the previously employed processes before hydrocyanic acid can be recovered therefrom.

The cyclic process, in accordance with the invention, is a considerable technical advance. Contrary to expectations, constant recycling of the solid materials to the cyaniding step, namely, the alkali metal carbonate, the graphite and catalyst does not impair their activity so that the cyclic process can be continued for a long time without replacement of the materials being recycled.

I claim:

1. In a process for the production of hydrocyanic acid by heating an alkali metal carbonate, reactive carbon and nitrogen in the presence of a solid catalyst to form a cyanide containing product and recovering hydrocyanic acid from such cyanide product the steps which comprise admixing with the starting materials a sufficient quantity of graphite to prevent the reaction mixture from becoming tacky under the conditions of the reaction, heating such mixture to form a cyanide containing product, and treating such product with steam and carbon dioxide to form hydrocyanic acid.

2. In a process for the continuous production of hydrocyanic acid by heating an alkali metal carbonate, charcoal and nitrogen in the presence of a solid catalyst to form a cyanide containing product and recovering hydrocyanic acid from such cyanide product, the steps which comprise admixing with the alkali metal carbonate, charcoal and catalyst a sufficient quantity of graphite to prevent the reaction mixture from becoming tacky under the conditions of the reaction, continuously introducing such mixture into a reaction zone, heating such mixture to temperatures over 800° C. while contacting such mixture with nitrogen to form a cyanide containing reaction product, continuously withdrawing the reaction product from the reaction zone and treating such product with steam and carbon dioxide to form hydrocyanic acid.

3. In a process for the continuous production of hydrocyanic acid by heating an alkali metal carbonate, charcoal and nitrogen in the presence of a solid catalyst to form a cyanide containing product and recovering hydrocyanic acid from such cyanide product, the steps which comprise admixing with the alkali metal carbonate, charcoal and catalyst a sufficient quantity of graphite to prevent the reaction mixture from becoming tacky under the conditions of the reaction, continuously introducing such mixture into a reaction zone, heating such mixture to temperatures over 800° C. while contacting such mixture with nitrogen to form a cyanide containing solid reaction product and an exhaust gas containing carbon monoxide and nitrogen, continuously withdrawing the solid reaction product and the exhaust gas from the reaction zone, converting the carbon monoxide in the exhaust gas to carbon dioxide, admixing such carbon dioxide with steam and treating the solid cyanide containing product with such carbon dioxide and steam mixture to form hydrocyanic acid.

4. In a process for the continuous production of hydrocyanic acid by heating an alkali metal carbonate, charcoal and nitrogen in the presence of a solid catalyst to form a cyanide containing product and recovering hydrocyanic acid from such cyanide product, the steps which comprise admixing with the alkali metal carbonate, charcoal and catalyst a sufficient quantity of graphite to prevent the reaction mixture from becoming tacky under the conditions of the reaction, continuously introducing such mixture into a reaction zone, heating such mixture to temperatures over 800° C. while contacting such mixture with nitrogen to form a cyanide containing reaction product, continuously withdrawing the reaction product from the reaction zone, treating such product with steam and carbon dioxide to form hydrocyanic acid and a mixture containing alkali-metal carbonate, said solid material and the catalyst, separating hydrocyanic acid therefrom, adding carbon to the alkali carbonate, graphite and catalyst mixture and recycling such mixture to the reaction zone.

5. In a process for the continuous production of hydrocyanic acid by heating sodium carbonate, carbon and nitrogen in the presence of iron powder as a catalyst to form a sodium cyanide containing product and recovering hydrocyanic acid from such product, the steps which comprise continuously introducing a mixture of sodium carbonate, charcoal, iron and graphite into a reaction zone, heating such mixture to temperatures over 800° C. while contacting said mixture with nitrogen to form a cyanide containing reaction product, the quantity of graphite in such mixture being sufficient to prevent such mixture from becoming tacky during the reaction, continuously withdrawing the reaction product from the reaction zone and treating such product with steam and carbon dioxide to form hydrocyanic acid.

6. In a process for the continuous production of hydrocyanic acid by heating sodium carbonate, carbon and nitrogen in the presence of iron powder as a catalyst to form a sodium cyanide containing product and recovering hydrocyanic acid from such product, the steps which comprise continuously introducing a mixture of sodium carbonate, charcoal, iron and graphite into a reaction zone, passing an electric current through said mixture to heat said mixture to temperatures over 800° C. while tumbling said material in said reaction zone and contacting said mixture with nitrogen to form a cyanide containing reaction product, the quantity of graphite in such mixture being sufficient to prevent such mixture from becoming tacky during the reaction, continuously withdrawing the reaction product from the reaction zone and treating such product with steam and carbon dioxide to form hydrocyanic acid.

7. In a process for the continuous production of hydrocyanic acid by heating sodium carbonate, carbon and nitrogen in the presence of iron powder as a catalyst to form a sodium cyanide containing product and recovering hydrocyanic acid from such product, the steps which comprise continuously introducing a mixture of sodium carbonate, charcoal, iron and graphite into a reaction zone, heating such mixture to temperatures over 800° C. while tumbling said material in said reaction zone and contacting said mixture with nitrogen to form a cyanide containing reaction product, the quantity of graphite in such mixture being sufficient to prevent such mixture from becoming tacky during the reaction, continuously withdrawing the reaction product from the reaction zone and treating such product with steam and carbon dioxide to form hydrocyanic acid.

References Cited in the file of this patent

UNITED STATES PATENTS

| | | |
|---|---|---|
| 1,174,944 | Bucher | Mar. 7, 1916 |
| 1,321,459 | Lewis | Nov. 11, 1919 |
| 1,385,335 | Metzer | July 19, 1921 |
| 1,473,826 | Metzer | Nov. 13, 1923 |